US012318821B2

(12) United States Patent
Staelens

(10) Patent No.: US 12,318,821 B2
(45) Date of Patent: Jun. 3, 2025

(54) DEVICE FOR REMOVING DUST FROM CLOSURES BY IONIZATION

(71) Applicant: ETABLISSEMENTS ANDRE ZALKIN ET CIE, Montreuil l'Argille (FR)

(72) Inventor: Laurent Staelens, Montreuil l'Argille (FR)

(73) Assignee: ETABLISSEMENTS ANDRE ZALKIN ET CIE, Montreuil l'Argille (FR)

( * ) Notice: Subject to any disclaimer, the term of this patent is extended or adjusted under 35 U.S.C. 154(b) by 247 days.

(21) Appl. No.: 17/793,252

(22) PCT Filed: Jan. 13, 2021

(86) PCT No.: PCT/FR2021/050054
§ 371 (c)(1),
(2) Date: Jul. 15, 2022

(87) PCT Pub. No.: WO2021/144532
PCT Pub. Date: Jul. 22, 2021

(65) Prior Publication Data

US 2023/0057098 A1 Feb. 23, 2023

(30) Foreign Application Priority Data

Jan. 17, 2020 (FR) ....................................... 2000431

(51) Int. Cl.
*B08B 7/04* (2006.01)
*B08B 5/02* (2006.01)
*B08B 5/04* (2006.01)
*B67B 3/00* (2006.01)
*H01T 23/00* (2006.01)

(52) U.S. Cl.
CPC ................ *B08B 7/04* (2013.01); *B08B 5/023* (2013.01); *B08B 5/043* (2013.01); *B67B 3/003* (2013.01); *H01T 23/00* (2013.01)

(58) Field of Classification Search
CPC ........... B08B 7/04; B08B 5/023; B08B 5/043; B67B 3/003; H01T 23/00
See application file for complete search history.

(56) References Cited

U.S. PATENT DOCUMENTS

2002/0152636 A1 10/2002 Ernst et al.

FOREIGN PATENT DOCUMENTS

CN 209866910 U 12/2019
DE 102020129774 A * 5/2021 ............... B08B 7/00

OTHER PUBLICATIONS

European Patent Office (ISA/EP), International Search Report (with English translation), International Application No. PCT/FR2021/050054, 5 pages, Jun. 28, 2021.

* cited by examiner

*Primary Examiner* — David Redding
(74) *Attorney, Agent, or Firm* — THOMPSON HINE LLP

(57) ABSTRACT

A device for removing dust from closures which are capable of circulating in a chute extending along a longitudinal axis (y-y'), includes a suction system arranged around the chute and are capable of sucking up the dissociated dust from the closures, and including at least one ionization bar extending longitudinally alongside the chute.

10 Claims, 2 Drawing Sheets

DEVICE FOR REMOVING DUST FROM CLOSURES BY IONIZATION

The present invention relates to removing dust from objects, and more particularly, ionizing cleaning devices for bottle closures.

Plastic caps or stoppers are examples of closures, without any limitation. Generally, it is any apparatus intended to ensure the watertight sealing of a container.

To achieve this, the closures circulate via a bottling line, which comprises, in a conventional manner, a conveyor which makes it possible to transfer said closures along the line to bottling machines which perform the different operations necessary for obtaining a finished product, such as for example a filled and stoppered bottle.

At the time of this transfer, the closures are cleaned in order to meet health requirements. Thus, different cleaning systems have been developed, for example cleaning by ionization.

Cleaning by ionization consists of neutralising the static charges of the closures by using antistatic equipment capable of neutralising the surface of charged closures by continuously generating positive and negative ions.

As a result, the materials are no longer attracted to one another and the dust is removed from the closure.

The term “dust” means any contaminating particle which may become embedded in or stuck to the closure.

There are several types of antistatic equipment depending on their use. For example, ionizing nozzles can be mentioned which are often arranged in cleaning systems for caps.

However, it has been found that these ionizing nozzles do not make it possible to remove dust with dimensions smaller than 0.5 mm.

Nanometric or micrometric-sized contaminants therefore remain attached to closures, which is problematic in terms of the health regulations to be observed.

The aim of the invention is therefore to overcome this disadvantage and propose a cleaning system capable of removing dust that has small dimensions from the closures.

For this purpose, according to a first aspect, a device is proposed for removing dust from closures which is capable of moving in a chute extending along a longitudinal axis, comprising suction means disposed around the chute and capable of suctioning dust removed from the closures, and at least one ionization bar extending longitudinally around the chute.

Said at least one ionization bar is made of anodised aluminum or stainless steel, and has length of at least 100 mm.

The chute makes it possible to transfer the closures from storage facilities to a bottling machine. The closures are cleaned during their transfer.

To achieve this, at least one ionizing antistatic bar connected to a blowing bar arranged on one of the longitudinal sides of the chute is used without limitation.

In order to remove the dust from a plurality of sides of the closure, it is advantageous to use a plurality of ionizing antistatic bars connected to a plurality of blowing bars and arranged on at least two longitudinal sides of the chute. For example, two ionization bars can thus be positioned with two blowing bars on the longitudinal sides opposite the chute.

The ionizing anti-static bars work by emitting an electric field composed of positive and negative ions through emitter tips powered by a high-voltage generator.

For example, the supply voltage is between 7 and 8 kV.

The use of ionization bars also makes it possible to expose the closures to ions for a longer period, which makes it possible to increase the chances of extracting dust that has small dimensions. This makes the device particularly suitable for bottling rates of over 10000 bottles per hour.

The longer closures are exposed to ions, the better they are cleaned. For example, an exposure time of more than 0.8 s. combined with ionization bars having a length of at least 100 mm. is advantageous for cleaning particles with micrometric or nanometric dimensions.

Advantageously, the suction means comprise a first nozzle extending longitudinally on one side of the chute, and a second nozzle extending along a transverse axis perpendicular to the longitudinal axis.

The first suction nozzle makes it possible to remove the ionized air charged with dust.

For cleaning the inner sides of the closure, the second nozzle arranged in this way makes it possible to suction dust found at this level.

Preferably, the suction means comprise at least one vacuum switch capable of detecting the vacuum generated by the first nozzle and/or the second nozzle.

Advantageously, the suction means comprise at least one blowing bar extending longitudinally around the chute and including a pressure switch capable of detecting a predetermined value of the pressure injected into the chute and a pressure regulator capable of adjusting said pressure.

Preferably, the first nozzle is in the form of an oblong hole and the second nozzle is adjustable.

This form has the advantage of facilitating the collection of air charged with dust.

With regard to the adjustment of the second nozzle, this consists more particularly of adjusting its distance from the caps so as to position it as close as possible to the caps, without disturbing their movement in the chute. In this way the efficacy of the dust suction is improved.

According to another aspect, the subject-matter of the invention is a housing comprising an access door to a removable chute extending along a longitudinal axis and a device for removing dust from closures as defined above.

Further aims, features and advantages of the invention will become apparent from the following description, given only by way of a non-limiting example, and made with reference to the accompanying drawings in which:

FIG. 1 shows a conventional bottling line denoted by the general reference numeral 1.

Figure 1:
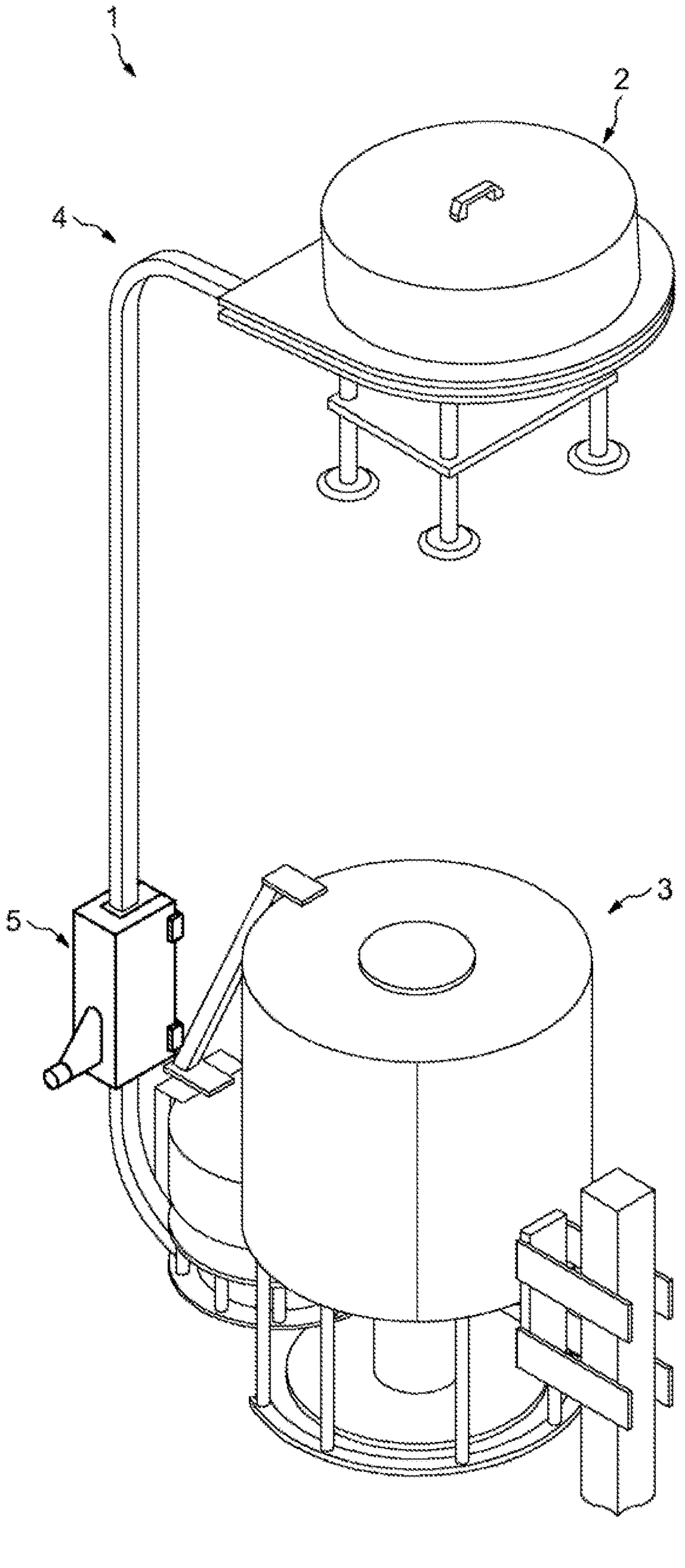
FIG. 1 shows schematically a bottling line comprising a device for removing dust from closures according to the invention.

The bottling line comprises storage means 2 suitable for storing closures, here caps, and a bottling machine 3 suitable for performing the operations necessary to obtain a finished product, for example a filled and sealed bottle.

In order to transfer the caps from the storage means 2 to the bottling machine 3, the bottling line comprises a removable conveyor 4, here a chute.

As illustrated, the chute 4 is surrounded by a device for removing dust from closures 5 which is capable of cleaning the caps which move between the storage means 2 and the bottling machine 3.

In other words, each cap is cleaned by said device 5 before it arrives in the bottling machine 3.

Figure 2:
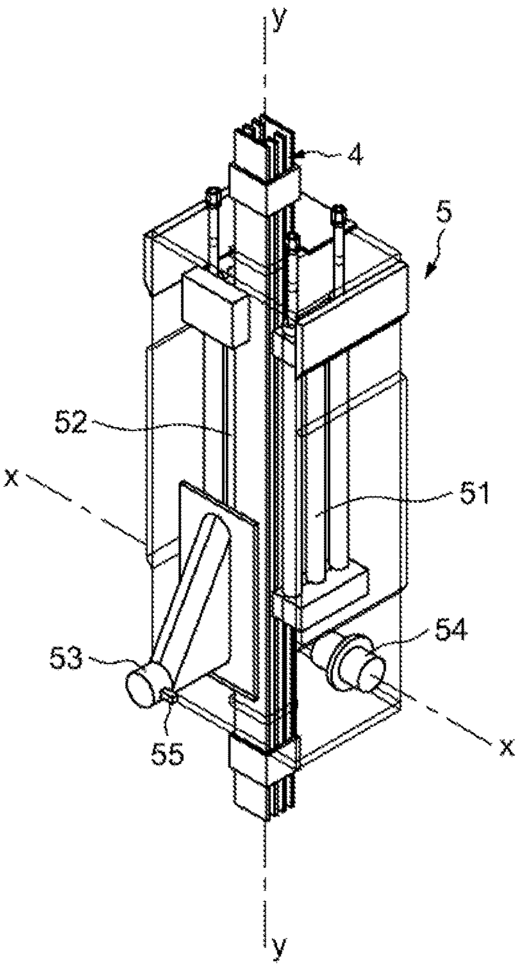
FIG. 2 shows schematically a device for removing dust from closures according to one embodiment of the invention.

Reference is now made to FIG. 2, which illustrates an embodiment of the device for removing dust from closures 5.

The device for removing dust 5 here comprises two ionization bars 51 and 52 which extend along a longitudinal axis y-y'.

The two ionization bars 51 and 52 are capable of emitting an electric field composed of positive and negative ions via emitter tips powered by a high-voltage generator not shown in the figure.

The caps are thus exposed to the electric field along the entire length of the ionization bars 51 and 52 to loosen as much dust as possible from the caps.

The dust is therefore floating in ionized air inside the chute 4.

In order to remove the dust and minimise its deposit in the chute 4 or again on the caps, it is advantageous to suction it.

For this purpose, the device for removing dust 5 comprises suction means including a first suction nozzle 53 and a second suction nozzle 54.

The first suction nozzle 53, which extends longitudinally on one of the sides of the chute 4, is capable of removing the ionized air charged with dust.

The first suction nozzle 53 is advantageously in the form of an oblong hole, which makes it possible to simultaneously suction a large amount of dust having any dimensions.

The second aspiration nozzle 54 is adjustable and extends along a transverse axis x-x' perpendicular to the longitudinal axis y-y'. It is used to clean the inside of the cap.

The suction means also comprise, in this example, two blowing bars which extend longitudinally around the chute 4.

The two blowing bars make it possible to loosen the discharged dust but also to put ionized air in contact with the caps.

Optionally, in order to check the operation of the suction means in an autonomous manner, a vacuum switch 55 is arranged where on a suction pipe common to the two nozzles 53 and 54.

Thus, an alert is generated if an insufficient vacuum is detected at the suction nozzles 53 and 54.

Figure 3:
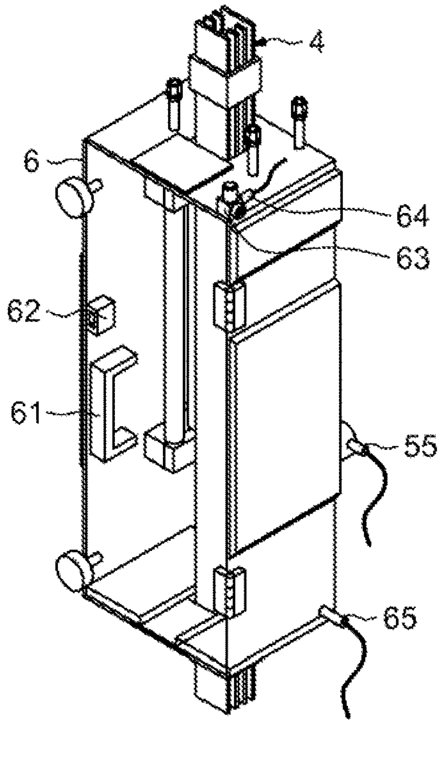
FIG. 3 shows a housing comprising said device for removing dust from closures according to one embodiment of the invention.

As illustrated in FIG. 3, the device for removing dust 5 is enclosed in a housing 6 which is accessed via a door 61.

For safety reasons, a position sensor 62 is arranged on the door 61 in order to detect whether the latter is open or closed.

Optionally, the device for removing dust 5 also comprises a pressure switch 64 suitable for detecting a predetermined pressure value of the air injected into the chute 4, and a pressure regulator 63 suitable for adjusting said pressure.

For information, the predetermined pressure value can be between 0 and 6 bar, depending on the requirements for the device for removing dust 5 and the desired speed.

Optionally, the housing comprises a device 65 capable of controlling the operation of ionization. More particularly it comprises the high-voltage generator which supplies the ionization bars 51 and 52, measures the voltage continuously and sends an alarm signal to the bottling line operators in case of failure.

Thus, the housing 6 allows the device for removing dust 5 to be self-managing and to diagnose, in a non-limiting manner, any operating problem relating to ionization, suction and air injection.

The invention claimed is:

1. A device for removing dust from closures moving in a chute extending along a longitudinal axis (y-y'), comprising: suction means arranged around the chute and capable of suctioning the dust removed from the closures, and at least one ionization bar extending longitudinally alongside the chute, said at least one ionization bar being made of anodised aluminum or stainless steel, having a length of at least 100 mm, wherein the suction means comprise a first nozzle on a first side of the chute, and a second nozzle on a second side of the chute.

2. The device according to claim 1, further comprising a housing surrounding a portion of the chute, the housing including a door for accessing the portion of the chute, wherein the at least one ionization bar extends within the housing and alongside the portion of the chute.

3. The device according to claim 1, wherein the first nozzle is in the form of an oblong hole and the second nozzle is adjustable.

4. The device according to claim 1, further comprising a housing surrounding a portion of the chute on all sides of the chute such that the portion of the chute traverses through the housing.

5. A device for removing dust from closures moving in a chute extending along a longitudinal axis (y-y'), comprising:
suction means arranged around the chute and capable of suctioning the dust removed from the closures, and at least one ionization bar extending longitudinally alongside the chute, wherein the suction means comprise a first nozzle extending longitudinally on one side of the chute, and a second nozzle extending along a transverse axis (x-x') perpendicular to the longitudinal axis (y-y').

6. The device according to claim 5, wherein the suction means comprise at least one vacuum switch configured for detecting a vacuum generated by the first nozzle and/or the second nozzle.

7. The device according to claim 5, wherein the first nozzle is in the form of an oblong hole and the second nozzle is adjustable.

8. The device according to claim 5, wherein said at least one ionization bar is made of anodised aluminum or stainless steel and has a length of at least 100 mm.

9. A device for removing dust from closures moving in a chute extending along a longitudinal axis (y-y'), comprising:
suction means arranged around the chute and capable of suctioning the dust removed from the closures, and at least one ionization bar extending longitudinally alongside the chute, the suction means comprise at least one blowing bar extending longitudinally alongside the chute and including a pressure switch configured for detecting a predetermined value of a pressure injected into the chute and a pressure regulator configured for adjusting said pressure.

10. The device according to claim 9, wherein said at least one ionization bar is made of anodised aluminum or stainless steel and has a length of at least 100 mm.

* * * * *